United States Patent [19]

Farley

[11] 4,168,230

[45] Sep. 18, 1979

[54] SYNERGISTIC COMPOSITION COMPRISING PHOSPHORYLATED ETHOXYLATED GLYCERINE AND POLYACRYLIC ACID FOR THE PREVENTION OF CACO₃ SCALE IN COOLING WATER

[75] Inventor: George T. Farley, Richboro, Pa.

[73] Assignee: Nalco Chemical Company, Oak Brook, Ill.

[21] Appl. No.: 912,135

[22] Filed: Jun. 2, 1978

Related U.S. Application Data

[63] Continuation of Ser. No. 740,565, Nov. 10, 1976, abandoned.

[51] Int. Cl.² .................................................. C02B 5/06
[52] U.S. Cl. ........................................ 210/58; 252/180
[58] Field of Search .............................. 210/54, 58, 59; 252/180, 181

[56] References Cited

U.S. PATENT DOCUMENTS

| 3,462,365 | 8/1969 | Vogelsang | 210/59 |
| 3,487,018 | 12/1969 | Troscinski | 210/58 |
| 3,502,587 | 3/1970 | Stanford et al. | 252/180 |
| 3,699,052 | 10/1972 | Petrey et al. | 252/389 |
| 3,728,420 | 4/1973 | Stanford et al. | 210/59 |
| 3,751,372 | 8/1973 | Zecher | 252/181 |
| 3,890,228 | 6/1975 | Hwa et al. | 210/58 |
| 3,931,038 | 1/1976 | Mochi-Bartolani et al. | 252/181 |
| 3,992,318 | 11/1976 | Gaupp | 252/181 |

FOREIGN PATENT DOCUMENTS

1414918  11/1975  United Kingdom ............ 210/58

Primary Examiner—Charles N. Hart
Assistant Examiner—Peter A. Hruskoci
Attorney, Agent, or Firm—John G. Premo; Robert A. Miller

[57] ABSTRACT

When certain low molecular weight polyacrylic acid salts are combined with an organic phosphate ester, an improved composition is afforded for preventing scale in industrial cooling systems.

2 Claims, 1 Drawing Figure

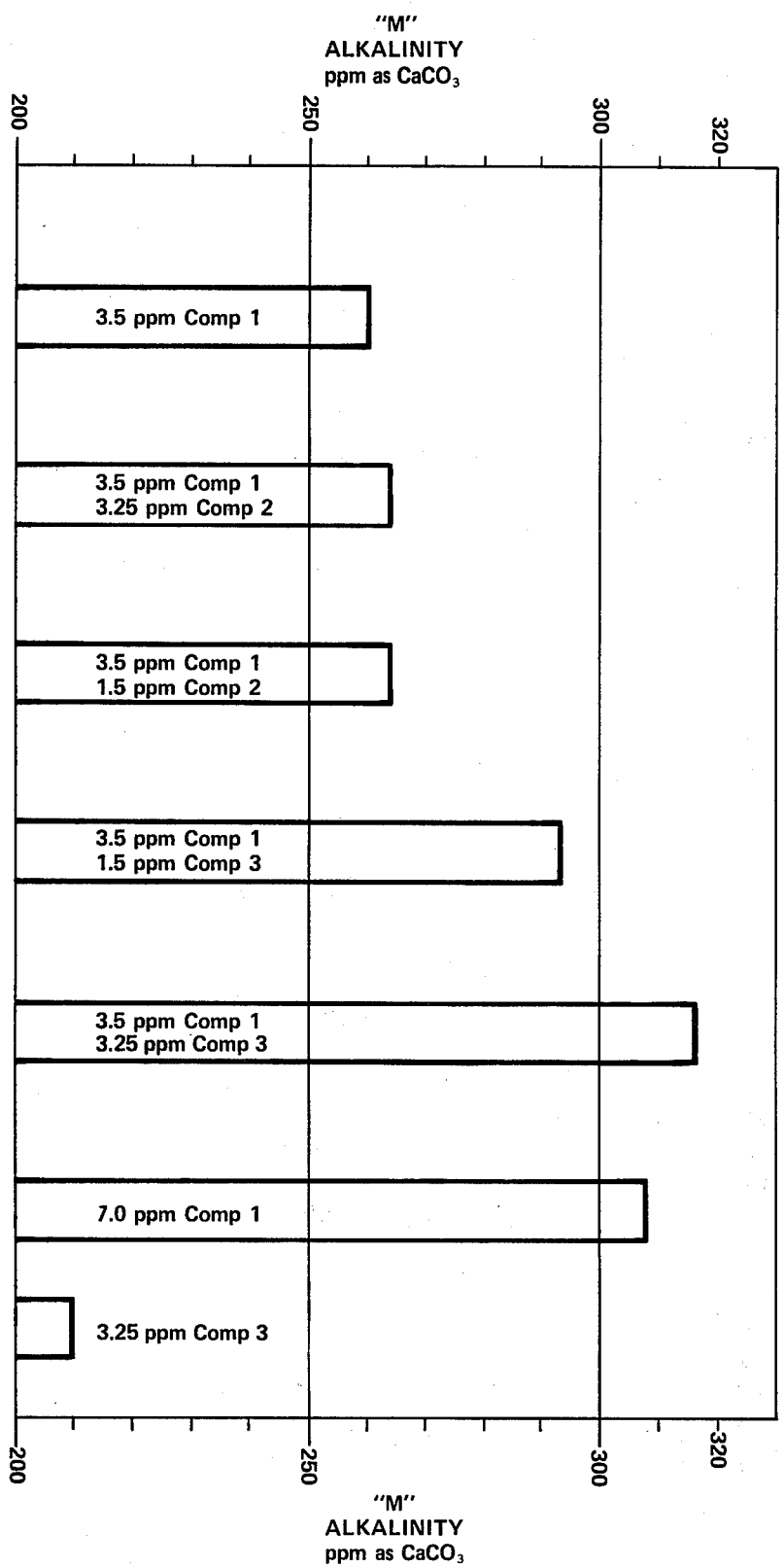

SYNERGISTIC COMPOSITION COMPRISING PHOSPHORYLATED ETHOXYLATED GLYCERINE AND POLYACRYLIC ACID FOR THE PREVENTION OF CACO₃ SCALE IN COOLING WATER

This is a Continuation of application Ser. No. 740,565 filed on Nov. 10, 1976, now abandoned.

INTRODUCTION

It is now known that certain phosphate esters are capable of being added to hardness-containing industrial cooling waters to prevent scale formation on various heat transfer surfaces. These esters somehow prevent hardness-forming salts, e.g. calcium, magnesium, barium, iron and the like from precipitating from these waters even though their normal saturation solubilities have been exceeded.

By interfering with these hardness-forming ions, it is possible to operate industrial cooling systems such as cooling towers with inordinately high amounts of hardness and alkalinity present without scale formation occurring. This invention is predicated on the discovery that by adding a small amount of a particular polymeric material in combination with said phosphate esters, it is possible to substantially increase the amount of supersaturation of potential scalants that may be carried in industrial cooling waters without deposition on heat transfer surfaces occurring.

THE INVENTION

The invention provides a composition for preventing scale in industrial cooling water systems which comprises (I) a water-soluble polyacrylic acid having a molecular weight between 3,000-12,000 and (II) a phosphate ester of a polyol of the formula:

$$(HO-)_xR[-O(R_1O-)_zCH_2CH_2OH]_y$$

wherein R is a saturated, hydrocarbon radical having two to six carbon atoms, $R_1$ is a member selected from the group consisting of:

x is a number average in the range of 0-5, inclusive, y is a number average in the range of 1-6, inclusive, and the sum of x plus y equals 3-6, and z is a number average in the range of 0-3, inclusive, with the weight ratio of I:II being within the range of 1:5 to 5:1.

The Water-Soluble Polyacrylic Acid

The water-soluble polyacrylic acid is always used in the form of its alkali metal ammonium or amine salts since the acid per se is relatively insoluble. Therefore, when a water-soluble polyacrylic acid is referred to herein, it is understood it would be in its water-soluble salt form. These polymers have an average molecular weight based upon intrinsic viscosity within the range of 3,000-12,000 with a preferred molecular weight range being 3,000-9,000. These materials are readily prepared by solution polymerization of acrylic acid or they may be prepared by the hydrolysis of low molecular weight polyacrylonitriles.

The Phosphate Esters

These materials are described in U.S. Pat. No. 3,462,365, the disclosure of which is incorporated herein by reference. These esters comprise phosphate esters of a phosphated composition derived by the reaction of phosphorus pentoxide with a polyol composition of the formula:

$$(HO-)_xR[-O(R_1O-)_zCH_2CH_2OH]_y$$

wherein R is a saturated, hydrocarbon radical having two to six carbon atoms, $R_1$ is a member selected from the group consisting of

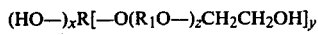

x is a number average in the range of 0-5 inclusive, y is a number average in the range of 1-6, inclusive, preferably 3-5, and the sum of x plus y equals 3-6, and z is a number average in the range of 0-3, inclusive.

Preferred embodiments include those in which said polyol is derived by oxyethylation of glycerol with 1.5 to 2.5 mols of ethylene oxide per mol of glycerol; those in which said polyol is derived by the oxyethylation of mannitol with about 2-20 mols of ethylene oxide per mol of mannitol; those in which said polyols are derived by the oxyethylation of sorbitol with about 2-20 mols of ethylene oxide per mol of sorbitol; those in which said polyol is derived by the oxyethylation of trimethylolpropane with 1.5 to 2.5 mols of ethylene oxide per mol of trimethylolpropane. Examples of these materials prior to reaction with either P₂O₅ or polyphosphoric acid are set forth in Table I of U.S. Pat. No. 3,462,365.

Example 1 of this patent shows the preparation of an ester that is extremely satisfactory as a scale preventative.

The polymers are combined with the esters to provide a weight ratio ranging between 1:5 to 5:1 with a preferred ratio being at about 1:1.

The combined treatment may be employed to treat cooling tower waters and the like at a dosage ranging as little as 0.5 ppm up to as high as 100 ppm. Typical dosage ranges would be 1-30 ppm.

To indicate the efficacy of the invention in preventing scale formation, a laboratory scale cooling tower was employed.

The pilot cooling tower (PCT) is quite flexible in its operation. The variables of heat flux, metallurgy, flow rate, pH, chemical feed rate, biocide program, holding time index, cycles of concentration, and make-up water analysis contribute to making this unit extremely valuable for many kinds of testing. Water is pumped from the tower basin by a variable speed pump through PVC piping from which a side stream is taken and passed through an electrical conductivity cell (sensor cell) and returned to the tower basin. The conductivity of the recirculating water as measured by the conductivity cell is compared to a set point. If the conductivity of the water is too high, the blowdown pump begins removing tower basin water at the rate of 70 ml/min. The chemical feed pump is activated simultaneous to the blowdown pump and begins adding fresh chemical at such a rate to provide the desired dosage based on blowdown water removed. Since the tower basin level is being lowered, a level controller activates the make-up solenoid and fresh make-up replaces the concentrated blowdown water thus reducing the overall conductivity of the recirculating water. The above explained mechanism accounts for the basic cooling tower variables of make-up, cycles of concentration, holding capacity, holding time index and calculated continuous blow-down rate.

Beyond the conductivity cell lies an in-line metallic thermometer which basically indicates the basin temperature. The basin temperature, however, can be regulated by an adjustable screw on the outside of a thermal sensor which protrudes into the tower basin. Beyond a given water temperature, this sensor activates the exhaust fan at the top of the tower and the counterflow induced draft provides the extra cooling needed to provide the desired basin temperature. With no fan cooling standard heat load, and normal recirculation rate, the basin temperature can reach 118° F.

An in-line rotometer indicates flow in gpm. This flow can be regulated at the variable speed pump which has a range of 0–3 gpm.

The pH of the system is monitored by pH electrodes which are in series with a Great Lakes pH analyzer. The pH analyzer has high set point capability. Beyond this high set point, the acid selenoid is activated and a dilute solution of sulfuric acid is fed until the pH becomes lower than the set point pH. Hysteresis can also be regulated.

After having seen pH electrodes, the water travels shellside on three heat transfer surfaces which can be of varying metallurgy. These tube specimens are generally admiralty brass unless corrosion of mild steel heat transfer surfaces is an objective of the test. The heat flux is provided by cartridge heaters of a given wattage. The desired heat flux may be gained by rheostating the heaters to the desired power output. Mild steel corrosion coupons sit mounted in lucite blocks beyond the heat transfer tubes. These latter specimens provide non-heat transfer corrosion and deposit results. Again, these coupons can be of various metallurgies but mild steel is most commonly employed since the majority of metal transmission lines are mild steel. The water then passes a magna corrater probe which can provide daily readout. The above discussed section of the unit provides the necessary information for performance on the metal surfaces for a given program.

The water then moves to a water distribution (closed deck) system and falls down honey combed PVC tower fill and into the basin where the recirculation process recurs.

Using the above described apparatus, a series of tests were performed using Chicago tap water with the temperature being adjusted to 110° F. The water was run continuously and at 24-hour intervals, the m alkalinity calcium and magnesium hardness levels were determined analytically. These analytical determinations continued until the system lost its balance based on these tests, thus indicating that the particular treatment was incapable of keeping the hardness containing ions in a non-precipitate forming state.

The compositions listed below were evaluated:

Composition 1—Ethoxylated glycerine (50% ethylene oxide) reacted with $P_2O_5$ per Example 38, U.S. Pat. No. 3,462,365;

Composition 2—Sodium polyacrylate having an average molecular weight of 40,000 prepared by the hydrolysis of polyacrylonitrile as per Example I of U.S. Pat. No. 3,419,502;

Composition 3—Sodium polyacrylate, molecular weight 6,000.

The results of these evaluations are set forth in the drawing. A study of the drawing indicates that the phosphate esters when used either alone or in combination with a 40,000 molecular weight sodium polyacrylate is little improved in its performance. On the other hand, when combined with the low molecular weight sodium polyacrylates preferred in the practice of this invention, the stabilization ability of the phosphate ester is nearly doubled. Finally, the results show that the low molecular weight polyacrylic acid polymers are virtually ineffective as a scale inhibitor or stabilizing treatment when used alone.

Having thus described my invention, it is claimed as follows:

1. A method for preventing calcium carbonate scale formation in industrial cooling water systems which comprises treating said cooling water with at least 0.5 ppm of a composition comprising (I) a water-soluble alkali metal or ammonium polyacrylate having a molecular weight between 3,000–12,000 and (II) a phosphate ester derived by reacting phosphorus pentoxide with a polyol of the formula:

$$(HO-)_x R[-O(R_1O-)_2 CH_2 CH_2 OH]_y$$

wherein R is a saturated, hydrocarbon radical having two to six carbon atoms, $R_1$ is a member selected from the group consisting of

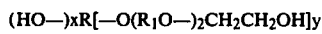

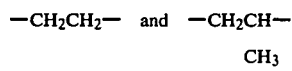

x is a number average in the range of 0–5, inclusive, y is a number average in the range of 1–6, inclusive, and the sum of x plus y equals 3–6, and z is a number average in the range of 0–3, inclusive. wherein said phosphate ester is a phosphated glycerol which has been reacted with 1.5 to 2.5 moles of ethylene oxide per mol of glycerol, and said composition has a weight ratio of I:II within the range of 1:5 to 5:1.

2. The composition of claim 1 where the weight ratio of I:II is about 1:1.

* * * * *